UNITED STATES PATENT OFFICE.

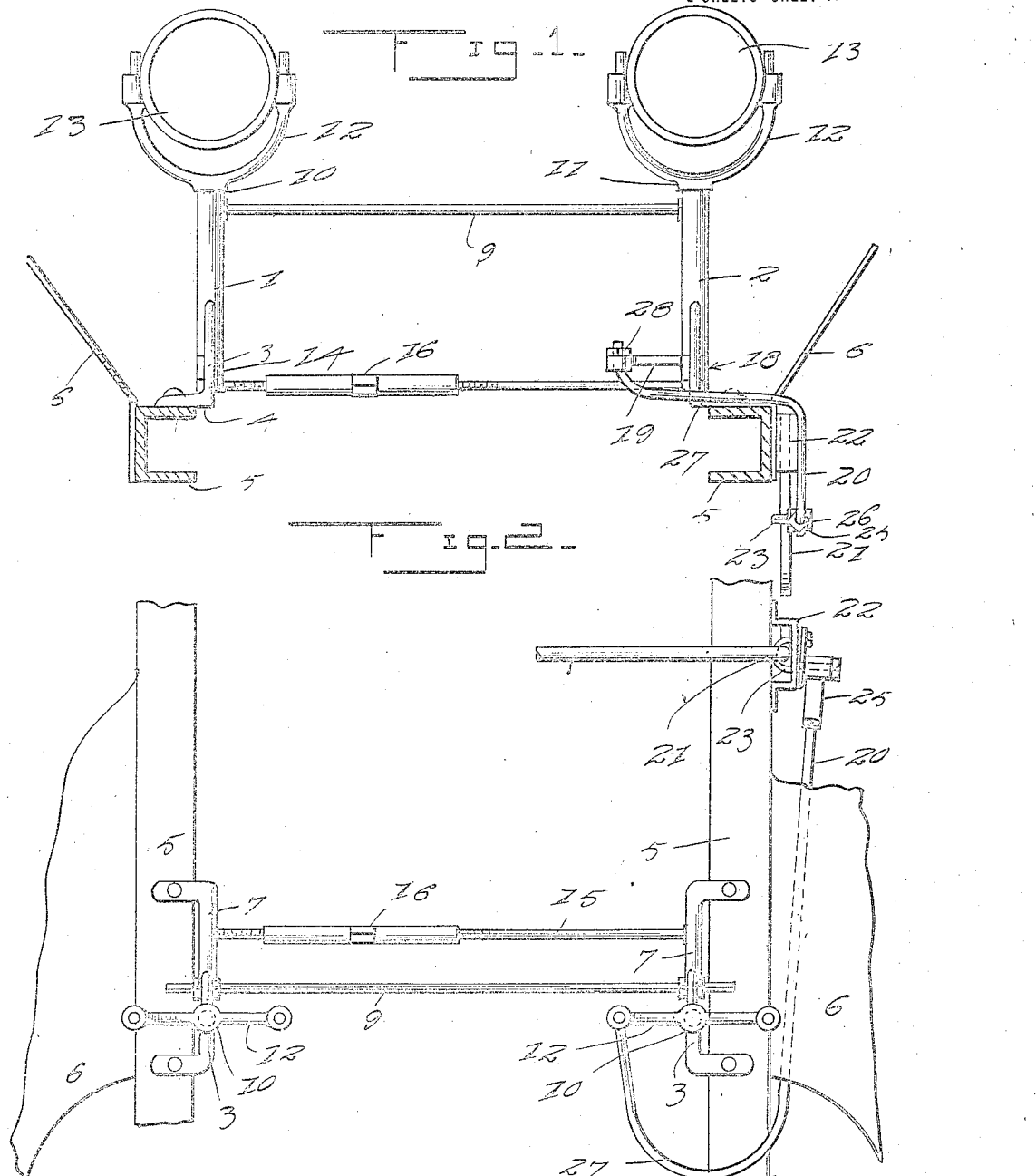

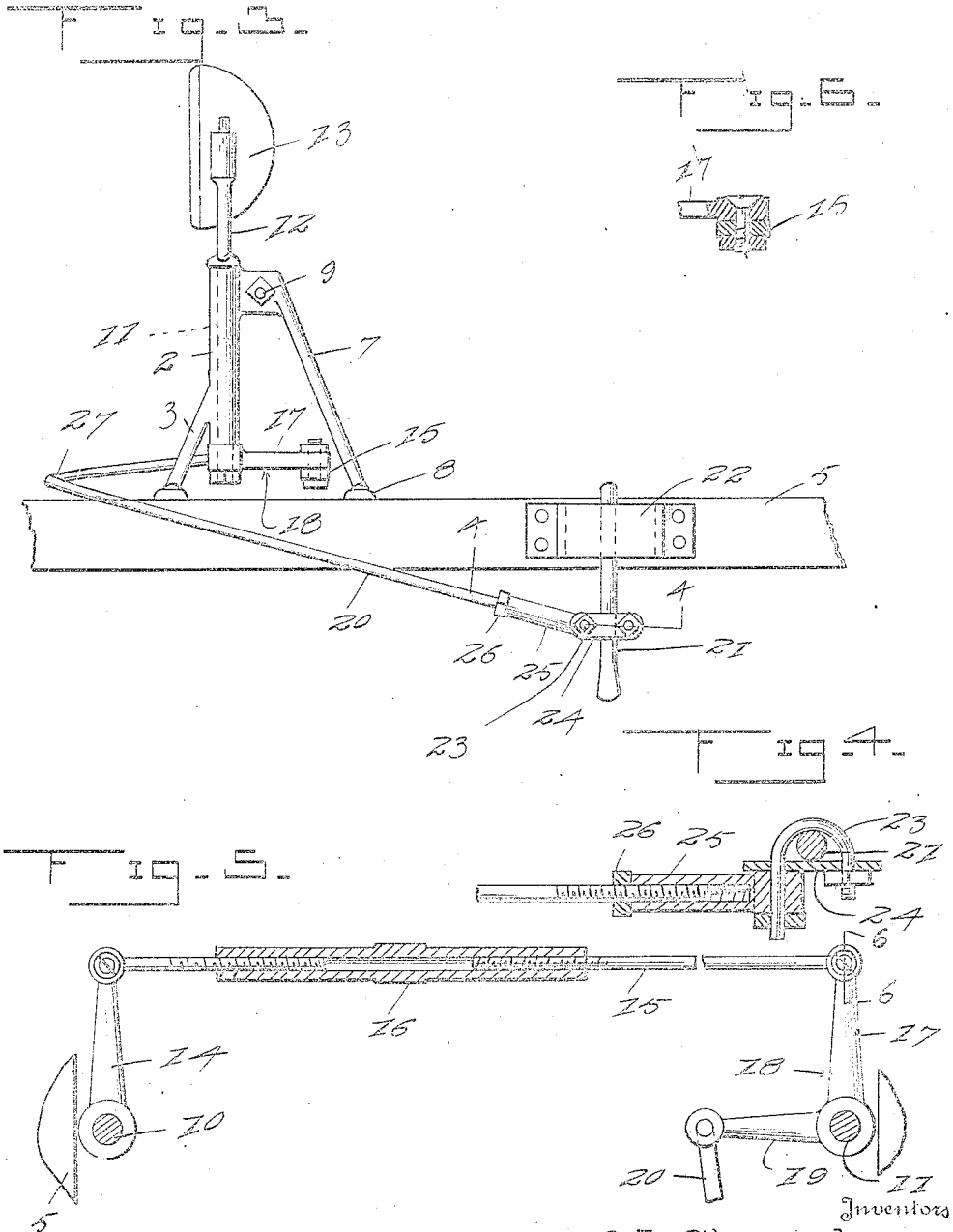

ARTHUR L. STEWARDSON AND JOHN D. HARPER, OF SANTA ANNA, TEXAS.

DIRIGIBLE HEADLIGHT.

1,213,706.

Specification of Letters Patent.

Patented Jan. 23, 1917.

Application filed September 1, 1916. Serial No. 118,078.

*To all whom it may concern:*

Be it known that we, ARTHUR L. STEWARDSON and JOHN D. HARPER, citizens of the United States, residing at Santa Anna, in the county of Coleman and State of Texas, have invented certain new and useful Improvements in Dirigible Headlights; and we do hereby declare the following to be a full, clear, and exact description of the invention, such as will enable others skilled in the art to which it appertains to make and use the same.

This invention relates to new and useful improvements in an automobile lamp bracket and attachment and one of its objects is the provision of a device of this character, which shall be simple, durable and efficient, and which may be manufactured and sold at a comparatively low cost.

Another object of this invention is to provide a pair of rotatably mounted lamp standards which are connected together to turn in a corresponding direction and one of the lamp standards being connected to the steering arm of the automobile, whereby the lamp standards will be turned to direct the rays of light from the headlights carried thereby in the path of the front wheels of the automobile at all times.

A further object of this invention is to provide an operating rod pivoted to the steering arm and extending forwardly of the lamp standards and being curved rearwardly and pivoted to one of the lamp standards, whereby the lamp standards will be turned upon movement of the steering arm to turn the front wheels of the automobile.

A still further object of this invention is to provide a U-shaped clamp secured to the steering arm and having a cylindrical member journaled thereon to which is adjustably secured the operating rod, whereby the turning of the lamp standards may be adjusted.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which:—

Figure 1 is a front elevation partly in section of a dirigible headlight, constructed in accordance with our invention, Fig. 2 is a top plan view of the same, illustrating it applied to an automobile, Fig. 3 is a side elevation of the same illustrating the operating rod, Fig. 4 is a detail sectional view taken on the line 4—4 of Fig. 3, Fig. 5 is a fragmentary top plan view partly in section, illustrating the connection between the lamp standards, and Fig. 6 is a detail sectional view taken on the line 6—6 of Fig. 5.

Referring in detail to the drawings, the numerals 1 and 2 illustrate lamp supporting bearings having formed adjacent their lower ends downwardly and forwardly projecting arms 3 which are bent at right angles to form attaching feet 4 that are bolted or otherwise secured to the chassis 5 of the automobile. The chassis 5 has the usual mud guards 6 secured thereto. Downwardly and rearwardly extending braces 7 are formed on the upper ends of the bearings 1 and 2 and have their lower ends bent at right angles to form attaching feet 8 which are bolted or otherwise secured to the chassis 5 which coöperate with the arms 3 for supporting the bearings 1 and 2 upon the chassis. The braces 7 are connected by a transversely extending rod 9 which brace the upper ends of the bearings 1 and 2.

Lamp standards 10 and 11 are journaled in the bearings 1 and 2 and have their upper ends forked as illustrated at 12 to receive ordinary headlights 13. A rearwardly extending arm 14 is secured to the lower end of the lamp standard 10 below the bearing 1 and has pivotally secured thereto a connecting rod 15, consisting of a pair of sections connected together by a turn buckle 16. The other end of the connecting rod 15 is pivoted to one of the arm portions 17 of a bell crank lever 18, carried by the lower end of the lamp standard 11. The other arm 19 of the bell crank lever 18 has pivotally secured thereto an operating rod 20, which will be hereinafter more fully described and is adapted to rotate the lamp standards 10 and 11 to turn the headlights 13, so that the rays of light therefrom will be directed in the path of the front wheels of the automobile at all times.

A steering arm 21 is operatively connected to the steering mechanism of an automobile (not shown) and depends downwardly from the chassis 5 upon one side thereof within a bracket 22 carried by the chassis. A substantially U-shaped member 23 is positioned upon the steering arm 21 and held thereon by a plate 24 which is mounted upon the arm portions of the U-shaped member 23. One of the arm portions of the U-shaped member 23 is of greater length than the other arm portion and has journaled thereon a cylindrical member 25 which is internally screw threaded to receive the screw threaded end of the operating rod 20. The operating rod 20 is locked within the cylindrical member 25 by a lock nut 26. The operating rod 20 extends forwardly from the cylindrical member 25 below one of the mud guards 6 to a point beyond the lamp standard 11 and is bent rearwardly as illustrated at 27, having its end bent at right angles and extending through the arm portion 19 of the bell crank lever 18 to receive a nut 28.

From the foregoing description taken in connection with the accompanying drawings, it will be noted that by forward movement of the steering arm 21 caused by the steering gear of the automobile not shown, the operating rod 20 will be moved forwardly, turning the lamp standards 10 and 11 to the right, causing the headlights carried thereby to direct their rays of light in the path of the front wheels when they are turned in a corresponding direction by the steering arm 21. When the steering arm 21 is moved rearwardly, the operating rod 20 will move in a corresponding direction, causing the lamp standards to be turned to the left, allowing the headlights carried thereby to direct their rays of light in the path of the front wheels when they are turned to the right.

While we have shown and described the preferred embodiment of our invention, it will be understood that minor changes in construction, combination and arrangement of parts may be made without departing from the spirt and scope of the invention as claimed.

Having thus described our invention, what we claim is:—

In combination, an automobile including a chassis and a steering arm, of a pair of lamp standards journaled to the chassis, headlights carried by said standards, means for connecting the standards together, a rod connected to one of the standards and having one end screw threaded, a substantially U-shaped member having the ends of its arm portions screw threaded and having the web portion thereof engaging the steering arm, a plate carried by the arm portions of said member and held in engagement with the steering arm, one of said arm portions of said member being of shorter length than the other and having a nut threaded thereon for forcing one end of the plate in the direction of the steering arm, and an internally screw threaded sleeve threaded to the rod and journaled on the arm portion of said member which is of greater length than the other arm portion.

In testimony whereof we affix our signatures in presence of two witnesses.

ARTHUR L. STEWARDSON.
JOHN D. HARPER.

Witnesses:
B. WEAVER,
L. V. STOCKARD.